UNITED STATES PATENT OFFICE.

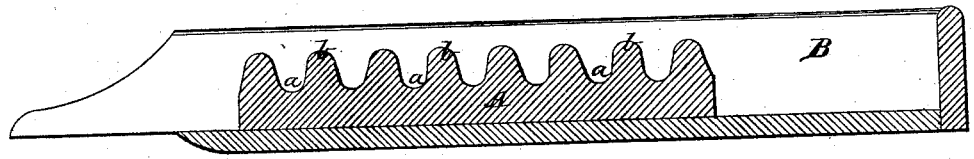
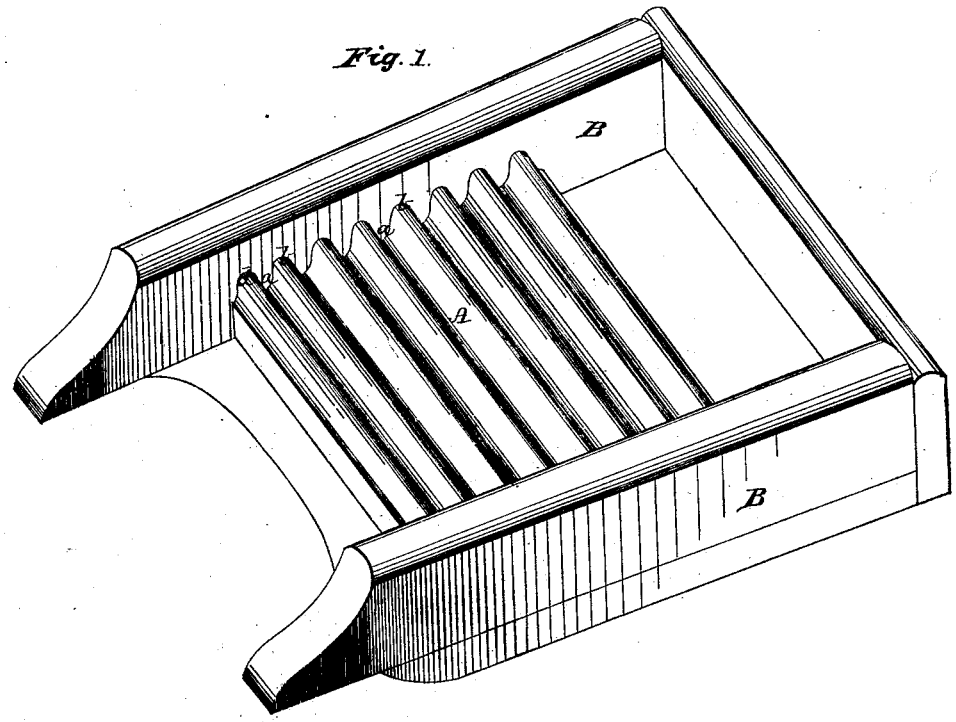

EDWARD HATFIELD, OF BROWNSVILLE, PENNSYLVANIA.

WASHBOARD.

Specification of Letters Patent No. 27,800, dated April 10, 1860.

*To all whom it may concern:*

Be it known that I, EDWARD HATFIELD, of Brownsville, Fayette county, State of Pennsylvania, have invented a certain new and useful Improvement in Washboards, of which the following is a full, clear, and exact description, reference being had to the accompanying drawing, forming part of this specification, in which—

Figure 1, represents a perspective view of my improved wash board. Fig. 2, represents a longitudinal section of the same.

Wash boards have hertofore been constructed with a rubbing surface of wood, of metal and of glass. The objections to those with a wooden rubber are that the wood becomes softened by the action of hot water and soap, and alkalies used with the water in washing, brooms or rubs up which gives a rough and splintery rubbing surface to the board, and is moreover liable to split or crack in drying after being immersed in hot water, which in a short time renders it perfectly useless. The metallic rubbing board corrodes from the action of soap and water and stains the clothes. Those boards with a glass rubbing surface are expensive, easily fractured by blows, and broken or shattered by immersion in hot water.

The object of my improvement is the production of a cheap, durable and effective wash board, not subject to the defects hereinbefore mentioned, and my invention consists in constructing the rubber of pottery, and inclosing the same in a proper frame to support it.

In the accompanying drawing is represented my improved wash board which consists of a rubbing plate (A,) of pottery ware molded in the proper form, and the surface made smooth by any of the well known modes. The face of the plate is formed with projections and depressions which extend over the entire surface, with the exception of a narrow portion near the ends which is covered by the frame. The back of the board may be slightly curved or a plain surface. The pottery rubbing plate thus formed is inclosed in a proper frame (B) either of wood or metal, and attached to it by the ends entering rabbets or grooves in the side of the frame and supported on the under side by a back plate.

The superiority of the pottery rubber over those heretofore used consists in its being unaffected by sudden changes in temperature, and not liable as is the glass rubber to crack or exfoliate on being immersed in hot water, or like the wooden rubber to become rough by use and split in drying after being soaked in hot water, or like the metallic rubber to corrode and stain or discolor the clothes.

Not only is this board superior to those heretofore used, but it is much cheaper and can be manufactured at about one-sixth of the expense of a glass board. Thus a better article is produced which can be afforded at a much less cost to the public.

Having thus described my improved wash board what I claim as a new article of manufacture and desire to secure by Letters Patent is—

A wash board with a rubber of pottery.

In testimony whereof I have subscribed my name.

EDWARD HATFIELD.

Witnesses:
N. W. ROBINSON,
WM. L. WILKINSON.